May 13, 1969     H. P. HALSEY     3,443,692

MAXIMIZING CONTROL SYSTEM

Filed April 14, 1966     Sheet 1 of 2

INVENTOR.
HOMER P. HALSEY
BY
Merchant & Gould
ATTORNEYS

INVENTOR.
HOMER P. HALSEY

3,443,692
MAXIMIZING CONTROL SYSTEM
Homer P. Halsey, Poland, Ohio, assignor to Reserve Mining Company, Silver Bay, Minn., a corporation of Minnesota
Filed Apr. 14, 1966, Ser. No. 542,665
Int. Cl. B01d *33/38, 21/24*
U.S. Cl. 210—97       5 Claims

ABSTRACT OF THE DISCLOSURE

A settling tank is disclosed that contains two liquids of differing specific gravities, located in two zones separated by an interface. Three pneumatic bubbler tubes extend into the tank to measure the pressure across each zone. Optimizer control means are provided to sense these two pressures and to maintain a maximum difference between them by controlling the amount of water entering the tank, to thereby hold the interface at a preferred level. The optimizer control means may lose control if the interface should shift radically as a result of one of the liquids occupying both zones, since the difference in pressures will then approach zero. To overcome this problem, means are provided to sum the two pressures to resolve the ambiguity as the difference approaches zero, and to override the optimizer control means and take control of the water supply until the interface returns to a controllable level.

---

Figure 1:
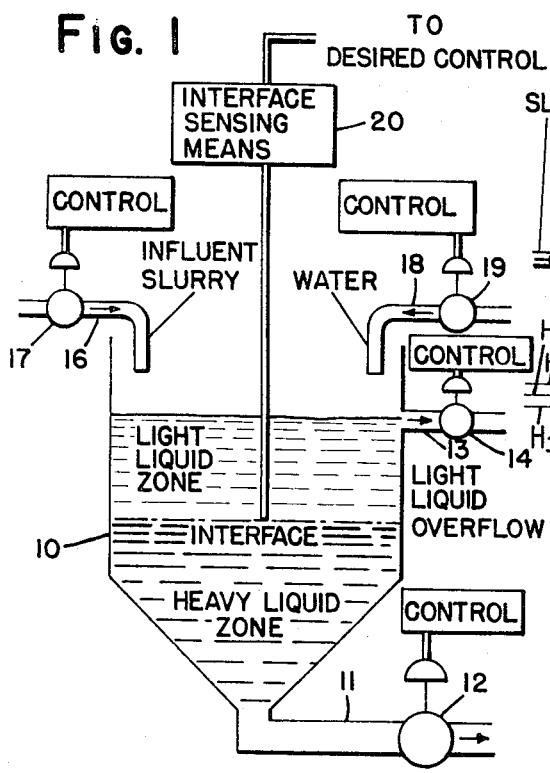

Many industrial processes operate at optimum conditions only when the difference between two measurable variables is maintained at a maximum value. If the difference between the two variables drops below the maximum value in either direction, it is then necessary to regulate a controlled variable in the system to again return the difference to maximum. Control systems are presently available that will perform this function. A problem can arise, however, if the difference between the two variables drops below a certain minimum value or approaches zero. Although the control system may continue to measure the difference, the difference becomes ambiguous as the value approaches zero. At some point, the available difference signal is too small to accurately indicate to the control system which direction the controlled variable must be moved to correct the situation. When this occurs, the control system often controls in the wrong direction to thereby aggravate the situation.

The purpose of my invention is therefore to provide an improved control system that will prevent a control system reversal from occurring when the difference signal is ambiguous. My invention provides monitoring means to supervise or measure certain characteristics of the two measurable variables to resolve the ambiguity. Means are provided to detect the fall of the difference between the two variables below a predetermined minimum value. When this occurs, control of the process is switched to the monitoring means which in turn drives the controlled variable such that the difference is increased. When the difference between the two variables again rises above the predetermined minimum value, the normal control system takes over to maximize the difference. The control system is, therefore, always in control regardless of any interruptions or disturbances in the process being controlled.

Although my invention will find use in many industrial processes, it was designed specifically for use as a liquid interface level control. If a mixture of two liquids having different specific gravities are introduced into a settling tank, the two liquids will separate by gravity. The light liquid can then be removed from the top of the tank while the heavy liquid can be removed from an outlet near the bottom of the tank. In such systems, the interface level must be maintained at a preferred level so that neither of the outlets from the tank are contaminated with the wrong liquid. The liquid interface level can be regulated by controlling the amount of heavy liquid leaving the tank, for example. Other methods of regulating the interface level are also available.

Systems for sensing the interface level for control purposes are also available. The most common system is a bubbler control system in which three tubes are inserted from the top of the tank into the liquid. One of the tubes senses the pressure above the desired interface, another tube senses the pressure at the desired interface level, and the other tube senses the pressure below the desired interface. The upper and lower tubes are normally placed at equal distances above and below the desired interface level, respectively. Differential pressure transmitters measure the differential pressures between the center and the upper and between the center and the lower tubes. A third differential transmitter then measures the differential in output between the first two transmitters. The interface will always be at the depth of the center tube when the difference between the two differential pressures is at a maximum. An optimizing or maximizing controller is then used to maintain the difference at a maximum.

With this type of control system, an ambiguous situation arises if the interface passes above the top tube or passes below the bottom tube. In either case, the specific gravity of the liquid between both sets of tubes will be the same so that the difference in differential pressures approaches zero. In prior art systems of this type, the maximizing controller could then lose control since nothing in the system indicated which direction the interface should be moved to return it to the proper position. Often, when an upset condition would drive the interface above or below the tubes, the control system would control in the wrong direction to aggravate the situation.

It is, therefore, a primary object of the present invention to provide a control system for maximizing the amount of difference between two variables and for detecting and correcting an ambiguity that occurs when the difference between the two variables falls below a predetermined minimum value.

It is a further object of my invention to provide a system for controlling the interface level in a tank normally having an upper zone of light liquid and a lower zone of heavy liquid therein, the interface level being measured by maximizing the difference between the differential pressures existing across the two zones, and in which the sum of the two pressure differentials is used to resolve the ambiguity that occurs when the interface passes above or below the two zones.

Figure 2:
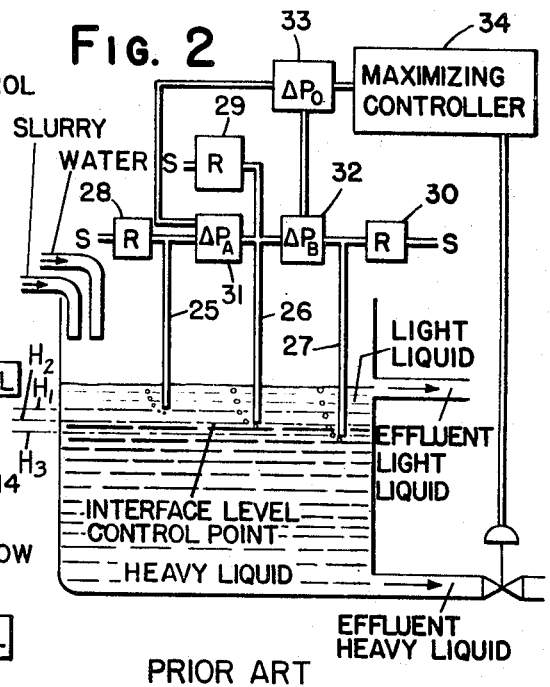
Figure 3:
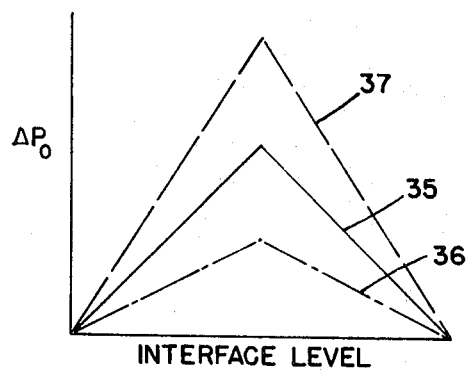
Figure 4:
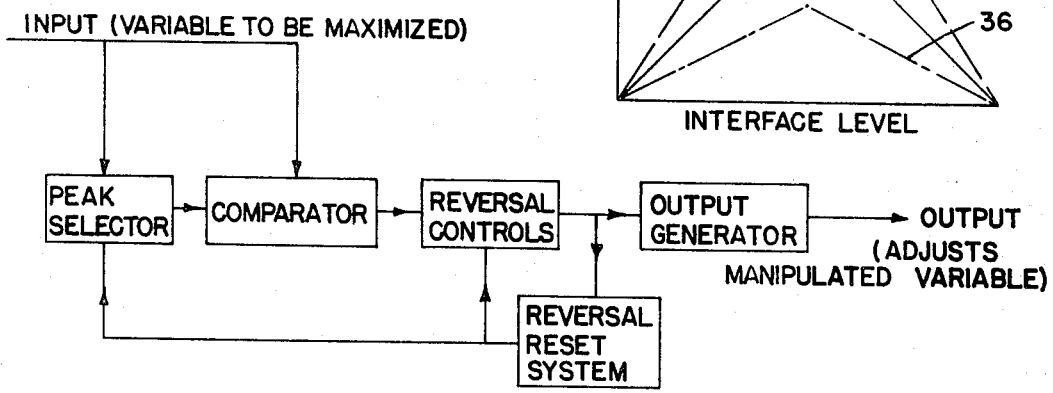
Figure 5:
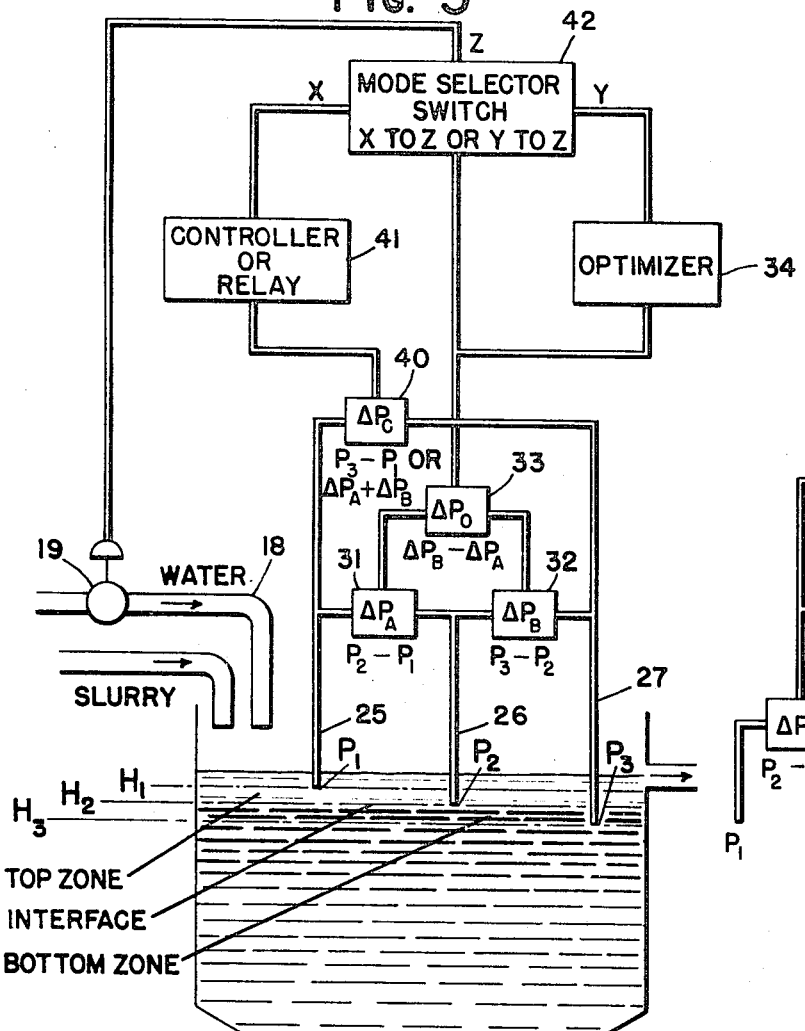
Figure 7:
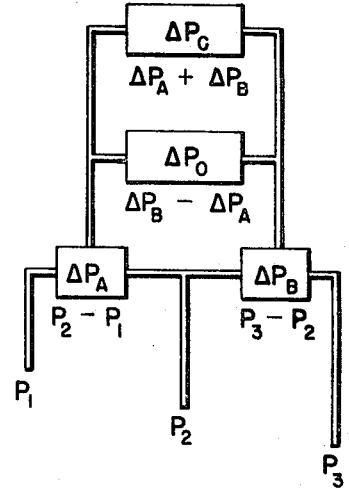
Figure 6:
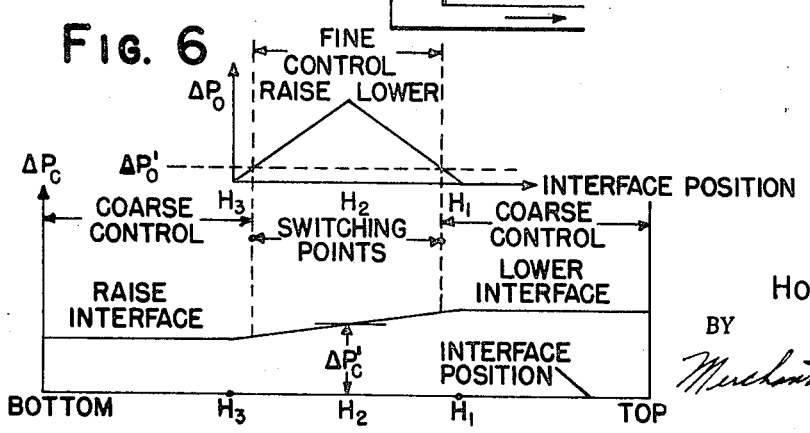

These and other objects of the present invention will become apparent when considered in connection with the following specification, in which the invention is described in connection with the accompanying drawings in which:

FIGURE 1 is a schematic representation of a typical hydro-separator;

FIGURE 2 discloses a typical prior art control system for a hydro-separator;

FIGURE 3 discloses graphically the operation of the control system shown in FIGURE 2, the graph disclosing the difference in pressure plotted versus the interface level;

FIGURE 4 discloses a function diagram of the maximizing controller used in FIGURE 2;

FIGURE 5 discloses in block diagram the interface level control system according to my invention;

FIGURE 6 discloses graphically the operation of the control system shown in FIGURE 5; and FIGURE 7 discloses an alternate arrangement of a portion of the control system disclosed in FIGURE 5.

Referring now to FIGURE 1, there is disclosed an apparatus for separating materials of different specific gravities. A more detailed description of this type of device can be found in the United States patent to Martin #2,560,809 that issued July 17, 1951. Since the present invention relates to a method of controlling the interface level in such a device, a detailed construction need not be shown here.

The separator in FIGURE 1 includes a settling tank 10 having a generally cylindrical configuration with a concave cone-shaped bottom portion. Extending from the bottom of the tank is a pipe 11 having a control valve 12 therein. Extending from near the top of tank 10 is an overflow pipe 13 having a control valve 14 mounted therein. Extending into the open top of tank 10 is a pipe 16 that carries the mixture to be separated. A valve 17 controls the amount of material that enters tank 10 through pipe 16. Also extending into the top of tank 10 is a water pipe 18 having a control valve 19 therein.

A typical use of this type of separating apparatus is in the separation of the magnetic iron ore from gangue in taconite. The taconite, when mined, is a hard rock containing magnetic iron ore mixed with undesirable substances. The taconite ore is first ground or pulverized to relatively small particle sizes. The magnetic iron particles must then be separated from the undesired silica and other substances constituting what are known as gangue. The method of separation in which we are interested employs the fact that the magnetic ore has a higher specific gravity than do the undesirable substances. The pulverized material is, therefore, placed in a liquid to form a slurry.

Referring again to FIGURE 1, the slurry enters tank 10 via pipe 16. At the same time, a supply of wash water is pumped into tank 10 through pipe 18. As the slurry mixes with the water in tank 10, the heavy magnetic ore tends to settle to the bottom of the tank. The lighter undesirable substances remain suspended in the upper portion of the tank. The settled magnetic ore can be removed from tank 10 through pipe 11 as controlled by valve 12 or other means. The light liquid at the top of the tank, containing the undesirable substances, is removed through overflow pipe 13 and discarded.

When the system achieves equilibrium, two zones of liquid are present in tank 10. There is a bottom zone of liquid carrying the heavier magnetic ore particles, and a top zone of liquid containing the lighter undesirable particles. The two liquid zones have different specific gravities or densities because of the different materials and/or the different relative amounts of these materials carried in the zones. The two zones define an interface between them.

The interface is maintained at some predetermined point in the tank as shown in FIGURE 1. If the interface moves toward the top of tank 10, some of the heavier magnetic ore particles will be discharged through the overflow and wasted. If, on the other hand, the interface should drop, some of the undesirable material will be discharged with the settled material, which is undesirable.

To maintain the interface at the preferred level, an interface control system is normally employed. An interface sensing means 20 is employed to detect the interface level. The interface level can be regulated by several different methods. Valve 12 can be opened or closed to change the amount of heavy liquid leaving the tank. Valve 14 can be controlled to regulate the amount of light liquid leaving the tank. Valve 17 can be controlled to change the amount of slurry entering the tank. The amount of wash water entering the tank can also be controlled by valve 19. The signal developed by the interface sensing means can thus be used to control one of the above valves. Pumps, or other flow control devices, could be substituted for the valves. Normally, the amount of water entering through pipe 18 is the preferred controlled variable.

The interface level in the tang is determined by the velocity of the uprising column of water. If this velocity is less than optimum, the interface level will drop. This can be remedied by increasing the amount of water flowing into tank 10 through pipe 18. The increase in wash water tends to agitate the liquid in the tank to reduce the settling rate. Conversely, if the interface level should rise, the amount of water entering the tank can be decreased to improve the settling rate and lower the interface.

FIGURE 2 discloses a prior art system for controlling the interface level in a settling tank. In this case, the amount of effluent heavy liquid leaving the tank is regulated to in turn regulate the interface level. In this control system, first, second and third bubbler tubes 25, 26 and 27 respectively, extend into the top of the tank. Tube 25 terminates above the interface, in the light liquid zone. Tube 26 terminates at the preferred interface level. Tube 27 terminates below the interface level, in the heavy liquid zone. A supply of air pressure is provided together with regulators 28, 29 and 30. Air at a constant flow or pressure is thus forced through each of the tubes and bubbles through the liquid to the surface thereof. Each tube will develop a specific pressure therein that depends upon the depth of liquid above the bottom of the tube and upon the specific gravity of the liquid.

A first differential pressure sensing means or transmitter 31 is connected between tubes 25 and 26. A second differential pressure transmitter 32 is connected between tubes 26 and 27. Transmitter 31 provides a signal $\Delta P_A$ indicative of the pressure differential between tubes 25 and 26. Transmitter 32 provides a signal $\Delta P_B$ indicative of the pressure differential between tubes 26 and 27. It is noted that the bottom of tube 25 and the bottom of tube 27 are an equal distance above and below the preferred interface level.

A third differential pressure transmitter 33 is connected to measure the differential in output between transmitters 31 and 32.

The interface will be at the preferred level when the output of the third transmitter 33 ($\Delta P_o$) is at a maximum value. With the interface at the preferred level, $\Delta P_A$ will be at a minimum value since both tubes 25 and 26 are completely covered with the light liquid. At the same time, $\Delta P_B$ will be at a high value since the tube 26 registers a relatively low pressure while tube 27 registers a relatively high pressure. Both a rise of the interface level and a drop of the interface level will result in a lowering of the value of $\Delta P_o$.

Since the interface will always be at the preferred level when the differences between $\Delta P_B$ and $\Delta P_A$ is at a maximum, a maximizing controller 34 can be used to control the interface level. Maximizing controller 34 senses $\Delta P_o$ and regulates the valve to return $\Delta P_o$ to a maximum value.

FIGURE 3 discloses a graph of $\Delta P_o$ versus interface level. Curves 35, 36 and 37 are plots of the system operation where different combinations of liquids are used. Curve 35 results when light and heavy liquids having a mean density are used. Curve 36 results when the light liquid is more dense or the heavy liquid is less dense. Curve 37 results when the light liquid is less dense or the heavy liquid is more dense. In all cases, however, a peak of the curve results where $\Delta P_o$ is at a maximum and the interface is at the preferred level. Maximizing controller 34 is designed to measure the amount and direction of change in $\Delta P_o$ from maximum and to regulate the valve to return $\Delta P_o$ to maximum.

The maximizing controller or optimizer 34 is a controller that is available from the Moore Products Co. of Philadelphia, Pa. The commercial embodiment is called the "Moore Optimizer Model 571." The operation of the optimizer is thoroughly discussed in a publication entitled, "Potential Application of Peak-Seeking Optimizers," by C. L. Mamzic, published in 1961. The publication is available from the Moore Products Co.

An operational diagram of the optimizer is shown in FIGURE 4. The input (variable to be maximized) would be $\Delta P_o$. The output (adjust manipulated variable) would be used to control the valve as shown in FIGURE 2. The operation of the optimizer is as follows. The peak-selector re-transmits any increase in input, but on a decreasing input, the peak-selector holds as a reference the highest value assumed by the input. Therefore, as long as the input is increasing, the peak-selector merely follows or tracks the input and the output adjusts the manipulated variable at a controlled rate. Once the input reaches the maximum value of $\Delta P_o$, it once again begins to decrease as shown in FIGURE 3. The peak-selector then remembers the highest value reached by the input and holds this as a reference for one side of the comparator. Since the input is now decreasing, there will be a difference between the input and this peak-selector reference value. This difference causes the comparator to actuate the reversal control system. The reversal control system immediately reverses the direction of the output. At the same time, the reversal reset system is actuated to isolate the reversal controls for a time sufficient to allow the process to change direction. During this reset cycle, the peak-selector is readjusted so that it starts tracking from the new lowered value of input. Since the output has been reversed, the input will again begin to increase in the opposite direction to a maximum value. When the input again reaches a maximum value and begins to decrease, the output will again be reversed to again maximize the input. The optimizer, therefore, continuously sweeps the input across the maximum value to continuously check its solution.

FIGURES 1-4 have disclosed a system and a prior art method of controlling the system. As long as the interface level remains between the bottom of tube 25 and the bottom of tube 27, the above described system will remain in control. In systems of this type, however, situations can occur that will disrupt the flow of material through the tank. If, for example, the slurry should stop flowing into the tank, the interface would drop below the bottom of tube 27. Since the volume between planes $H_1$ and $H_3$ would contain a liquid of the same specific gravity, $\Delta P_A$ would equal $\Delta P_B$. $\Delta P_o$ would, therefore, equal zero. At this point, the optimizer could lose control since the signal $\Delta P_o$ is not meaningful.

The same ambiguous situation arises if the interface rises above the bottom of tube 25. If the tank becomes full of the heavy liquid, no pressure differential exists between the two zones. Again, $\Delta P_A$ equals $\Delta P_B$, and $\Delta P_o$ approaches zero. Because the signal $\Delta P_o$ is ambiguous, optimizer 34 could begin to control in the wrong direction to further aggravate the situation.

Referring now to FIGURE 5, there is disclosed my invention, an improved control system for controlling the interface level, including means for resolving the above described ambiguity to prevent the optimizer from controlling in the wrong direction. The system being controlled, the pressure sensing system, and the basic control system are the same as those disclosed in FIGURE 2. The pressure in tube 25 is indicated as $P_1$, in tube 26 as $P_2$, and in tube 27 as $P_3$. A fourth differential pressure transmitter 40 ($\Delta P_C$) has been connected into the system to measure the pressure difference between $P_3$ and $P_1$. The output from transmitter 40 is fed into a controller or relay 41 that is capable of controlling valve 19 in wash water line 18. A mode selector switch 42 has also been added to the system. Mode selector switch 42 is capable of switching control of valve 19 to either controller 41 or optimizer 34. The output from transmitter 33 is used to control switch 42.

The operation of the control system is as follows. As long as the interface remains in the top or bottom zone, a difference in output will be measured between transmitters 31 and 32. The signal from transmitter 33, therefore, is utilized by optimizer 34 to control valve 19 through selector switch 42. Optimizer 34 loses control only if $\Delta P_o$ drops below a minimum value and approaches zero. Switch 42 constantly monitors the signal $\Delta P_o$. When $\Delta P_o$ drops below the predetermined minimum value, switch 42 transfers control of valve 19 to controller 41. Transmitter 40 and controller 41 then resolve the ambiguity and act to control valve 19 until $\Delta P_o$ rises above the predetermined minimum value. At that point, switch 42 again transfers control of the valve to optimizer 34.

Transmitter 40 is a differential pressure transmitter that measures the pressure difference between $P_3$ and $P_1$. An output signal is provided that is proportional to the pressure differential. Transmitter 40, therefore, provides a signal $\Delta P_C$ that is equal to $P_3$ minus $P_1$. Although $\Delta P_C$ directly indicates the difference between $P_3$ and $P_1$, it is obvious from the construction of the system that $\Delta P_C$ will also be equal to the sum of $\Delta P_A$ and $\Delta P_B$. Therefore, $\Delta P_C$ effectively sums $\Delta P_A$ and $\Delta P_B$ on a continual basis. As previously mentioned, the purpose of transmitter 40 is to resolve the ambiguity that occurs when the interface rises above the top zone or drops below the bottom zone. In both of these cases, $\Delta P_o$ drops below a minimum usable value.

$\Delta P_C$ resolves the ambiguity as follows: With the interface at level $H_2$ (the preferred level) $\Delta P_C$ will equal $\Delta P'_C$, which is the sum of $\Delta P_A$ and $\Delta P_B$ at that particular time. Now let us assume that the interface level begins to rise toward the top of the tank. $\Delta P_B$ will remain at the same value since the composition of the liquid between tubes 26 and 27 does not change. $\Delta P_A$, however, will begin to rise in value as the heavy liquid rises toward $H_1$. Since $\Delta P_A$ increases as the interface level rises in the tank, $\Delta P_C$ will also increase.

Now let us assume that the interface level begins to drop in the tank. Under these conditions, $\Delta P_A$ does not change in value since the same type of liquid is present between tubes 25 and 26. $\Delta P_B$, however, begins to decrease in value as the interface level drops since $P_3$ decreases as the lighter liquid begins to replace the heavier liquid in the bottom zone. Since the value of $\Delta P_B$ decreases as the interface level falls, the value of $\Delta P_C$ also decreases.

In summary, the value of $\Delta P_C$ varies directly with the interface level. If the interface level rises, $\Delta P_C$ rises. If the interface level falls, $\Delta P_C$ also falls. Therefore, even though the signal from transmitter 33 ($\Delta P_o$) becomes ambiguous upon either a fall or rise of the interface level, the signal from the transmitter 40 ($\Delta P_C$) clearly indicates the direction of the interface level. Controller 41, therefore, can control valve 19 to regulate the interface level in accordance with the output from transmitter 40.

Referring now to FIGURE 6, there is disclosed graphically the operation of the control system shown in FIGURE 5. The fine control, as disclosed on the graph, is provided by optimizer 34. The coarse control is provided by controller 41 in conjunction with transmitter 40. The bottom portion of the graph is a plot of $\Delta P_C$ (ordinate) versus interface position (abcissa). The graph shows that the value of $\Delta P_C$ rises as the interface level rises from the bottom of pipe 27 to the bottom of pipe 25. Above the bottom of pipe 25, $\Delta P_C$ remains at some maximum constant value. Below the bottom of pipe 27, $\Delta P_C$ remains at some minimum constant value. The normal value of $\Delta P_C$ is $\Delta P'_C$, with the interface level at $H_2$, the preferred level.

Referring to the top portion of the graph, $\Delta P_o$ (ordinate) is plotted versus interface position (abcissa). $\Delta P_o$ will be at a maximum value with the interface level at $H_2$. As the interface level approaches either $H_1$ or $H_3$, however, the value of $\Delta P_o$ approaches zero. A minimum value $\Delta P'_o$ is, therefore, established below which control of the water valve is shifted from optimizer 34 to controller 41. Selector switch 42 is set to response to the value $\Delta P'_o$. When $\Delta P_o$ drops below $\Delta P'_o$, switch 42 switches control of valve 19 to controller 41. If the value of $\Delta P_C$ is below $\Delta P'_C$, indicating a low interface level, action is taken by controller 41 to raise the interface. If the value of $\Delta P_C$ is above $\Delta P'_C$, indicating a high interface level, action is taken by controller 41 to lower the interface. When the interface level begins to move back toward $H_2$, $\Delta P_0$ will increase above $\Delta P'_0$. At this point, switch 42 returns control to optimizer 34.

FIGURE 7 of my disclosure indicates an alternate method of arriving at $\Delta P_C$. Instead of measuring the difference between $P_3$ and $P_1$ as shown in FIGURE 5, this embodiment would provide a value of $\Delta P_C$ by directly adding $\Delta P_A$ and $\Delta P_B$. There is no difference in the control concept since $\Delta P_C$ equals $P_3$ minus $P_1$ and also equals $\Delta P_A$ plus $\Delta P_B$.

Although it is obvious from my disclosure that pneumatic components were utilized in constructing the preferred embodiment of my invention, it should be evident that the invention lies in the system approach rather than in the particular type of components selected to perform the necessary functions. My invention could, therefore, be embodied in either an electrical or electronic control system as well as a pneumatic control system without departing from the inventive functions. Neither should my invention be limited to the control of an interface level in a settling tank. The control theory disclosed herein will apply to any industrial process in which a variable is being maximized and in which an ambiguity can arise if the variable departs from the normal control range. My invention should, therefore, be limited only by the scope of the appended claims.

What is claimed is:

1. In apparatus for separating a slurry into two components having different specific gravities, in which said slurry and a wash liquid are introduced into a settling tank having a first overflow outlet in an upper portion thereof and a second outlet in a lower portion thereof and in which said component having the higher specific gravity settles to a bottom zone of said tank for removal through said second outlet, and said component having the lower specific gravity remains suspended in said wash liquid in a top zone for removal through said first outlet, said zones defining an interface between them; a control system for maintaining said interface at a preferred level, comprising:
    (a) a source of regulated air pressure;
    (b) first, second and third bubbler tubes extending into said tank from the top thereof and terminating respectively in said top zone, at said preferred interface level, and in said bottom zone, said first and third tubes terminating at equal distances above and below said preferred interface level, said source of air pressure being connected to each of said tubes;
    (c) a first differential pressure transmitter connected between said first and second tubes;
    (d) a second differential pressure transmitter connected between said second and third tubes;
    (e) a third differential pressure transmitter connected between said first and second transmitters, a maximum pressure difference between said first and second transmitters indicating said interface is located at said preferred level;
    (f) a fourth differential pressure transmitter connected between said first and third tubes, each of said transmitters sensing a difference in pressure and providing an output indicative of said pressure differential;
    (g) a flow control device for varying the flow of wash liquid into said tank, an increase in flow causing said interface to rise and a decrease in flow causing said interface to drop;
    (h) optimizer control means responsive to the signal from said third transmitter to position said flow control device to continually maximize said signal to maintain said interface at said preferred level;
    (i) coarse control means responsive to the signal from said fourth transmitter to position said flow control device; and
    (j) selector means responsive to the signal from said third transmitter to switch control of said flow control device from said optimizer control means to said coarse control means upon said signal decreasing below a predetermined minimum, and to return control to said optimizer control means upon said signal increasing above said minimum.

2. In the apparatus for separating a slurry into two components having different specific gravities, in which said slurry and a wash liquid are introduced into a settling tank having a first overflow outlet in an upper portion thereof and a second outlet in a lower portion thereof and in which said component having the higher specific gravity settles to a bottom zone of said tank for removal through said second outlet, and said component having the lower specific gravity remains suspended in said wash liquid in a top zone for removal through said first outlet, said zones defining an interface between them; a control system for maintaining said interface at a preferred level, comprising:
    (a) first, second and third fluid pressure sensing means extending into said tank and terminating respectively in said top zone, at said preferred interface level, and in said bottom zone, said first and third sensing means terminating at equal distances above and below said preferred interface level, said fluid pressure sensing means each providing an output signal indicative of the sensed pressure;
    (b) first differential sensing means connected to sense the outputs from said first and second pressure sensing means;
    (c) second differential sensing means connected to sense the outputs from said second and third pressure sensing means;
    (d) third differential sensing means connected to sense outputs from said first and second differential sensing means, a maximum differential indicating said interface is located at said preferred level;
    (e) fourth differential sensing means connected between said first and third pressure sensing means, each of said differential sensing means sensing a difference in output signals and providing an output signal indicative of said differential;
    (f) a control device for varying the amount of liquid flow in said tank to regulate said interface level;
    (g) optimizer control means responsive to the output signal from said third differential sensing means to position said control device to continually maximize said signal to maintain said interface at said preferred level;
    (h) coarse control means responsive to the output signal from said fourth differential sensing means to position said control device; and
    (i) selector means responsive to the signal from said third differential sensing means to switch control of said control device from said optimizer control means to said coarse control means upon said signal decreasing below a predetermined minimum and to return control to said optimizer control means upon said signal increasing above said minimum.

3. In the apparatus for separating a slurry into two components having different specific gravities, in which said slurry and a wash liquid are introduced into a settling tank having a first overflow outlet in an upper portion thereof and a second outlet in a lower portion thereof and in which said component having the higher specific gravity settles to a bottom zone of said tank for removal through said second outlet, and said component having the lower specific gravity remains suspended in said wash liquid in a top zone for removal through said first outlet said zones defining an interface between them; a control system for maintaining said interface at a preferred level, comprising:
  (a) first, second and third fluid pressure sensing means extending into said tank and terminating respectively in said top zone, at said preferred interface level, and in said bottom zone, said first and third sensing means terminating at equal distances above and below said preferred interface level, said fluid pressure sensing means each providing an output signal indicative of the sensed pressure;
  (b) first differential sensing means connected to sense the outputs from said first and second pressure sensing means;
  (c) second differential sensing means connected to sense the outputs from said second and third pressure sensing means;
  (d) third differential sensing means connected to sense outputs from said first and second differential sensing means, a maximum differential indicating said interface is located at said preferred level;
  (e) fourth differential sensing means connected between said first and third pressure sensing means, each of said differential sensing means sensing a difference in outoutput signals and providing an output signal indicative of said differential;
  (f) a control device for varying the amount of liquid flow in said tank to regulate said interface level;
  (g) optimizer control means responsive to the output signal from said third differential sensing means to position said control device to continually maximize said signal to maintain said interface at said preferred level;
  (h) coarse control means responsive to the output signal from said fourth differential sensing means to position said control device; and
  (i) selector means to switch control of said control device from said optimizer control means to said coarse control means upon the pressure differences sensed between said first and second pressure sensing means and between said second and third pressure sensing means becoming generally equal.

4. In a level control system having first means for measuring the amount of difference between first and second normally different measurable variables, control device means for changing a controlled variable in either of two opposite directions to regulate said measurable variables, and optimizer means for maximizing said difference by controlling said control device means in response to said first means, said first and second measurable variables normally having different measurable values, said first and second variables both being capable of approaching said first or said second value under abnormal conditions, means for maintaining said system in proper control, comprising:
  (a) signal means for monitoring said two measurable variables and for summing the values thereof to resolve the ambiquity that occurs when said first and second variables approach the same value;
  (b) second control means responsive to said signal means for controlling said control device means; and
  (c) means to sense a fall of said difference below a predetermined value and thereupon shift control from said optimizer means to said second control means until said difference rises above said predetermined value.

5. In a level control system having first and second variables whose value differ by a measurable amount that can be controlled by changing a third controllable variable in either of two opposite directions, said first and second variables normally having first and second different measurable values, said first and second variables both being capable of approaching either said first or said second value under abnormal conditions; a control system for maximizing the amount of difference between the values of said first and second variables comprising:
  (a) first means for measuring the valves of said first and second variables;
  (b) means including said first means for producing a first signal indicative of the amount of difference between the values of said first and second variables;
  (c) optimizer control means responsive to said first signal for changing said third controllable variable in the proper direction to continuously maximize said amount of difference under normal conditions;
  (d) means for summing the values of said first and second variables to provide a second signal to resolve the ambiquity that occurs under abnormal conditions when said first and second variables approach the same value, said second signal indicating whether said two variables are both approaching said first or said second value;
  (e) coarse control means responsive to said second signal for changing said third controllable variable in a proper direction to increase said difference under abnormal conditions; and
  (f) means responsive to said first signal for switching control of said third controllable variable from said optimizer control means to said coarse control means when said difference becomes ambiguous, said coarse control means changing said third controllable variable in a proper direction to increase said difference.

References Cited
UNITED STATES PATENTS

| | | | |
|---|---|---|---|
| 3,375,928 | 4/1968 | Chase | 210—114 X |
| 2,202,197 | 5/1940 | Ewertz | 23—304 X |
| 2,613,535 | 10/1952 | Bonn | 73—302 |
| 2,777,816 | 1/1957 | Schumacker et al. | 210—206 X |
| 2,886,051 | 5/1959 | Kroll et al. | 73—439 X |
| 3,038,336 | 6/1962 | Peters | 73—299 |
| 3,114,381 | 12/1963 | Klose et al. | 73—299 X |
| 3,209,971 | 8/1965 | Trethewey | 73—302 X |

RENBEN FRIEDMAN, *Primary Examiner.*

JOHN ADEE, *Assistant Examiner.*

U.S. Cl. X.R.

137—391, 454; 210—110, 114